United States Patent [19]

Pepper, Jr. et al.

[11] Patent Number: 4,778,951

[45] Date of Patent: Oct. 18, 1988

[54] ARRAYS OF RESISTIVE ELEMENTS FOR USE IN TOUCH PANELS AND FOR PRODUCING ELECTRIC FIELDS

[75] Inventors: William Pepper, Jr., Bethesda, Md.; Robert A. Moog, Leicester, N.C.

[73] Assignee: Peptek, Inc., Bethesda, Md.

[21] Appl. No.: 140,885

[22] Filed: Jan. 4, 1988

Related U.S. Application Data

[63] Continuation of Ser. No. 531,309, Sep. 12, 1983, abandoned.

[51] Int. Cl.$^4$ .............................................. G08C 21/00
[52] U.S. Cl. ...................................................... 178/18
[58] Field of Search ............... 178/18, 19; 340/365 R, 340/365 VL, 365 S, 365 C, 365 A

[56] References Cited

U.S. PATENT DOCUMENTS

| | | | |
|---|---|---|---|
| 3,767,858 | 10/1973 | Rodgers | 178/18 |
| 4,293,734 | 10/1981 | Pepper | 178/18 |
| 4,430,917 | 2/1984 | Pepper | 84/1.01 |

Primary Examiner—Stafford D. Schreyer
Attorney, Agent, or Firm—Jim Zegeer

[57] ABSTRACT

Selected touch point locating apparatus has an array of two or more electrical touch members constituted by impedance elements coupled to a circuit for causing electric current to flow through a selected touch point as the algebraic sum of separate currents through the electrical touch members. The relative amplitudes are translated into at least two signals corresponding to the location in two axes of the selected touch point.

8 Claims, 4 Drawing Sheets

ARRAYS OF RESISTIVE ELEMENTS FOR USE IN TOUCH PANELS AND FOR PRODUCING ELECTRIC FIELDS

This application is a continuation, of application Ser. No. 531,309, filed Sept. 12, 1983, abandoned.

BACKGROUND OF THE INVENTION

This invention relates to devices for providing information, in the form of electrical signals, about the position of a source or sink of electric current relative to two or more current-carrying electrodes. In particular, it relates to devices for converting selected touch points or positions on a surface (reflecting hand motions) into electric signals to provide an interface between man and machine. It also relates to systems for producing electric fields with predetermined characteristics.

This invention is an improvement on U.S. Pat. No. 4,293,734, titled "TOUCH PANEL SYSTEM AND METHOD", and issued to William Pepper, Jr. On Oct. 6, 1981; U.S. Pat. No. 4,198,539, titled "SYSTEM FOR PRODUCING ELECTRIC FIELD WITH PREDETERMINED CHARACTERISTICS AND EDGE TERMINATIONS FOR RESISTANCE PLANES THEREFOR", and issued to William Pepper, Jr. on Apr. 15, 1980; and U.S. Pat. No. 4,371,746, titled "EDGE TERMINATIONS FOR IMPEDANCE PLANES", and issued to William Pepper, Jr. on Feb. 1, 1983.

The present invention, makes said Touch Panel System and Method practical for two-dimensional applications where the size of the touch panel is very small in one dimension relative to the other. It further provides a means for making a touch panel with good linearity in two dimensions using resistive material with good uniformity in only one dimension. The present invention is thus an improvement in the art of human-machine interfacing.

This invention is also an improvement on William Pepper, Jr.'s pending patent application Ser. No. 068,802 titled "HAND-HELD MUSICAL INSTRUMENT AND SYSTEMS INCLUDING A MEN-MACHINE INTERFACE APPARATUS", filed Aug. 22, 1979 now U.S. Pat. No. 4,430,917. It adds a second dimension of control to the pitch-determining elements of that patent application and thus is an improvement in electronic musical instruments.

BRIEF SUMMARY OF THE INVENTION

In said U.S. Pat. No. 4,293,734, which is hereby incorporated by reference, a resistance element or impedance layer is required as part of the apparatus for producing an output signal or signals corresponding to the position of the finger in one or more axes. This resistance element or impedance layer divides the electric current flowing through the user's finger into components that are inversely proportional to the distances of the boundaries of said resistance element or impedance layer from the selected touch point.

A hybrid device can be made using two or more resistive elements that are connected so that varying the portions of the fingertip placed over the several resistive element causes the output for one axis to change, while the output for the other axis changes as a function of finger position along the length of said resistive elements. This combination has a number of practical advantages over either of the methods alone. For instance, in said Pepper U.S. Pat. No. 4,430,917, resistive elements are used as one-dimensional touch panels to control the pitch of musical notes. It would be desireable to increase the expressiveness of this musical instrument by making said resistive elements sensitive to rolling of the finger from side to side (transverse to the pitch-determining axis) and using this second dimension of control to modify the amplitude, or some other characteristic of the musical note, as desired by the player. Means for adding a second dimension of control (and also a third pressure-sensitive dimension) are described in afore-mentioned Pepper U.S. Pat. No. 4,293,734. However, techniques of making resistive surfaces for two-dimensional touch panels, such as those described in U.S. Pat. No. 4,198,539, are difficult to apply to a resistive surface of such small width.

The present invention achieves the desired effect by placing two electrical touch members, such as two linear resistive elements, less than a finger-width apart so they can be spanned by a finger. The four ends of these two resistive elements are connected to the same circuitry described in Pepper U.S. Pat. No. 4,293,734. Although there is no electrical connection between these two resistive elements, it can be shown that they perform the same function as the linearized resistive surface in Pepper U.S. Pat. No. 4,293,734.

The hybrid invention as described above can be extended to arrays of more than two resistive elements. This is useful because, while resistive material can be fabricated by a continuous web process to have excellent uniformity parallel to the length of the web, it is difficult to maintain comparable uniformity of resistivity across the web. If the linearized resistive surface in U.S. Pat. No. 4,293,734 is replaced with a multiplicity of parallel resistive elements whose ends are interconnected with an appropriate resistor network, the linearity of the touch panel perpendicular to the length of the resistive elements will be determined by the resistor network, while the linearity parallel to the elements will be determined primarily by the uniformity within each element.

BRIEF DESCRIPTION OF THE DRAWINGS

The above and other objectives, advantages and features of the invention will be fully understood from the following detailed description and accompanying drawings wherein.

DETAILED DESCRIPTION

Figure 1:
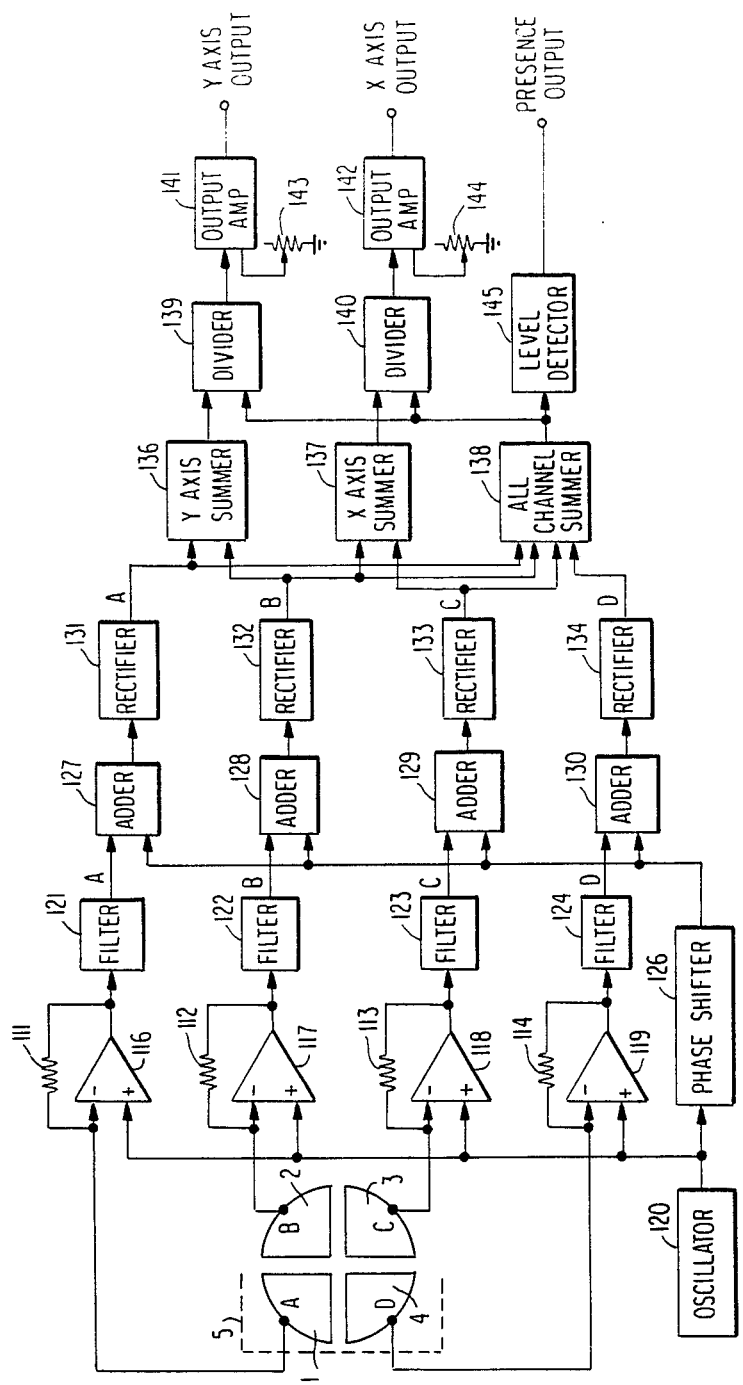
FIG. 1 is a block diagram of a two-axis touch panel as disclosed in Pepper application Ser. No. 513,133, filed July 12, 1983.
Figure 4:
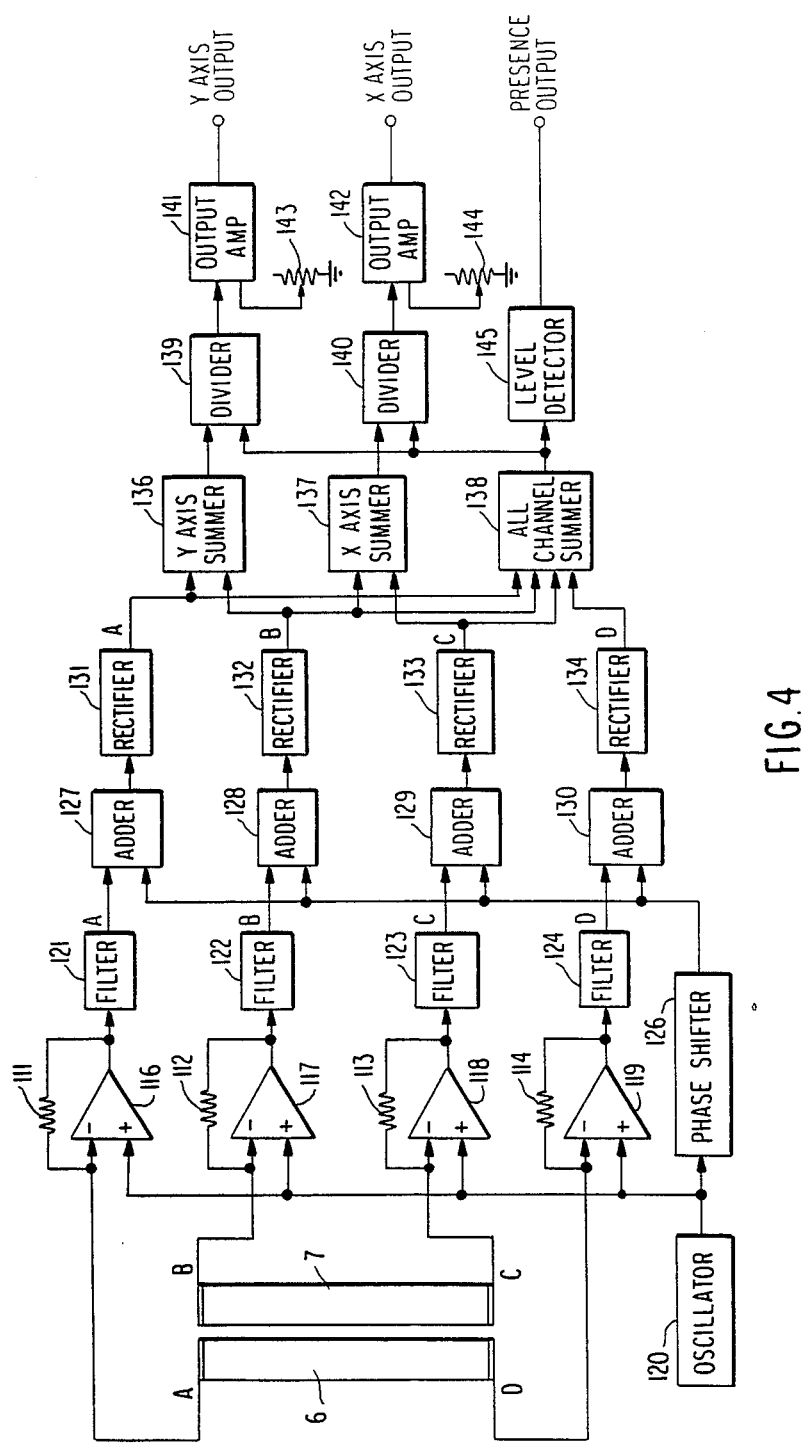
FIG. 4 is a block diagram of the two resistive elements of FIG. 3 and the associated circuitry.

In FIG. 1 the block diagram corresponds to FIG. 4 of U.S. Pat. No. 4,293,734, to which an array of four conductive quadrant electrodes has been added, replacing the linearized resistive surface shown in U.S. Pat. No. 4,293,734 It will be assumed in the following discussion that the quadrant electrodes 1, 2, 3, and 4 are covered by an insulating film (indicated at 5) so that there is no ohmic contact with the user's finger, although an insulating film is not necessary. When the user's finger, (not shown) is placed over the center of the array, so that the capacitances between the finer and each of the quadrant electrodes 1, 2, 3, and 4 are equal, equal currents will flow through all four connections A, B, C, and D, and both X-axis and Y-axis outputs will be in the middle of their range. Rolling the finger upwards will increase the current in quadrant electrodes 1 and 2 and connections A and B while decreasing the currents in quadrant electrodes 3 and 4 and connections C and D. This will cause an increase in the Y-axis output but will not change the X-axis output. It can thus be seen that both outputs will vary continuously as the finger is rolled over the quadrant electrode array.

When the quadrant electrical surface is touched by the user, small currents flow through the four terminations A, B, C, and D. Voltages proportional to these currents are developed across the feedback resistors 111, 112, 113, and 114 of the four input amplifiers 116, 117, 118, and 119, respectively, as the amplifiers follow the output of oscillator 120. The amplifier outputs are applied to four high-pass filters 121, 122, 123, and 124 respectively. These filters are not essential to system operation, but were added to eliminate the 60-Hz signals that may be picked up by the user's body from power wiring. Filters 121–124 attenuate 60-Hz signals while passing the oscillator 120 frequency which is typically 20 KHz. However, the 60-Hz (or any radiant ambient environment energy field) may also be used as a source of position signal energy for the touch panel surface.

Subtraction of the oscillator signal component from the filter outputs is accomplished by first shifting the phase of the oscillator signal approximately 180° in phase shifter 126 and then adding the phase-shifted signal to the filter outputs in adder circuits 127, 128, 129, and 130, respectively. The resulting signals are rectified in rectifiers 131, 132, 133, and 134, respectively, to provide d-c levels proportional to the amplitudes of the a-c signals. The levels corresponding to the top two terminations A and B connected to quadrant electrodes 1 and 2 are summed by the Y-axis summer 136, the levels corresponding to the right-hand two terminations B and C connected to quadrant electrodes 2 and 3 are summed by the X-axis summer 137, and all four levels A, B, C, and D are summed by the all channel summer 138 to provide a denominator input for the two dividers 139 and 140. These dividers 139 and 140 then operate on the X-axis and Y-axis sums to perform the divisions of equation 10 above, and the output amplifiers 141 and 142 with adjustable offset 143 and 144 and gain provide the desired X-axis and Y-axis outputs described herewith. A level detector 145 monitors the all channel summer 138 output and switches state when the users finger touches the quadrant electrodes 1, 2, 3 and 4.

As noted above, it is not necessary for the users finger to make ohmic contact with the electrodes surface; a thin insulating layer may be deposited over the electrode material for protection, and capacitive coupling through the insulating layer will still provide adequate current for system operation.

Figure 2:
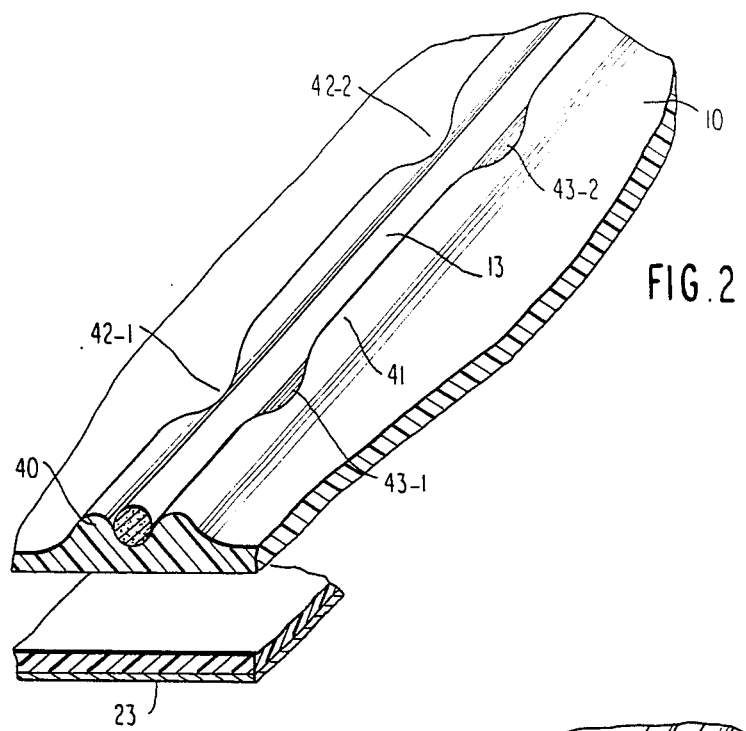
FIG. 2 is a reproduction of FIG. 3 in Pepper Patent Application Ser. No. 068,802 now U.S. Pat No. 4,430,917.
Figure 3:
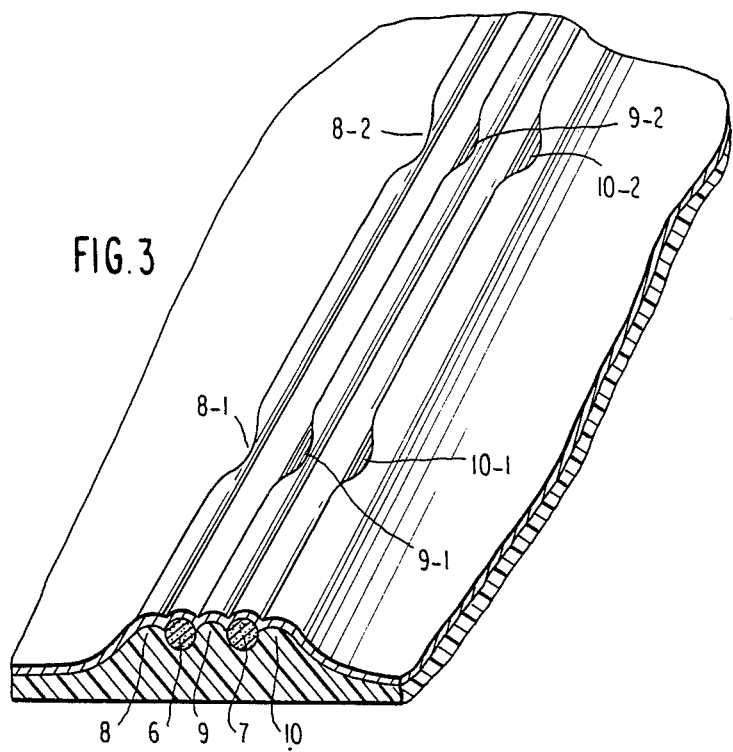
FIG. 3 shows FIG. 2 modified to incorporate the present invention.

FIG. 2 is a reproduction of FIG. 3 in Pepper U.S. Pat. No. 4,430,917, showing resistive element 13 confined between ridges 40 and 41. Notches 42-1, 42-2, and 43-1, 43-2 provide tactile information to the user, musician or player to enable him to place his finger on resistive element 13 at precise note intervals.

FIG. 3 illustrates the improvement of the present invention as it applies to the invention of Pepper U.S. Pat. No. 4,430,917. Two resistive elements 6 and 7 are placed less than a finger-width apart in ridges 8, 9, and 10 so the player can roll a finger from one to the other. This side-to-side control dimension will be called the X-axis. Notches 8-1, 8-1 . . . 9-1,9-2 . . . and 10-1, 10-2 . . . provide tactile information to musician.

FIG. 4 is a block diagram of the two resistive elements of FIG. 3 and their associated circuitry, which corresponds to FIG. 4 of U.S. Pat. No. 4,293,734. The operation is the same as given above in connection with FIG. 1.

When the player touches the left resistive element of FIG. 3, current flows only through connections A and D in FIG. 4. The Y-axis output is proportional to the location of the player's finger along the length of the left resistive element. The X-axis output is at one extreme of its range.

If the musician or player now rolls his finger from the left resistive element 6 toward the right resistive element 7, the Y-axis output will remain proportional to the location of the finger along the length of the resistive elements. As current begins to flow through the right resistive element 7, the X-axis output will change so as to be proportional to the total currents in each of the two resistive elements 6 and 7, respectively. When current no longer flows through the left resistive element 6, the X-axis output will be at the opposite extreme of its range. Thus the player can independently control the two outputs by two different finger motions.

It can be shown as follows that the operation of the electronic circuitry with the two resistive elements is essentially equivalent to its operation with a linearized resistive surface as described in Pepper U.S. Pat. No. 4,293,734. The pair of equations identified as (10) in U.S. Pat. No. 4,293,734 can be shown to apply to the present invention also:

$$x = k(1) + k(2) \frac{i(B) + i(C)}{i(A) + i(B) + i(C) + i(D)} \quad (1)$$

$$y = k(1) + k(2) \frac{i(A) + i(B)}{i(A) + i(B) + i(C) + i(D)} \quad (2)$$

When the player's finger is only touching the left resistive element 6, the currents i(B) and i(C) are zero and the equations become:

$$x = k(1) + k(2) \frac{0}{i(A) + i(D)} \quad (3)$$

$$y = k(1) + k(2) \frac{i(A)}{i(A) + i(D)} \quad (4)$$

The ratio of currents is seen to be zero in the X-axis equation, while the Y-axis current rate follows the one-dimensional relationship given by equation 7 of Pepper U.S. Pat. No. 4,293,734.

When the player's finger is equally on both resistive elements 6 and 7, i(A)=i(B) and i(C)=i(D) by symmetry. The equations can now be written:

$$x = k(1) + k(2) \frac{i(A) + i(D)}{2i(A) + 2i(D)} \quad (5)$$

$$y = k(1) + k(2) \frac{2i(A)}{2i(A) + 2i(D)} \quad (6)$$

The X-axis current ratio is seen to be ½, and the Y-axis current ratio is the same as before.

When the player's finger is touching only the right resistive element 7, currents i(A) and i(D) are zero and the equations become:

$$x = k(1) + k(2) \frac{i(B) + i(C)}{i(B) + i(C)} \qquad (7)$$

$$y = k(1) + k(2) \frac{i(B)}{i(B) + i(C)} \qquad (8)$$

The X-axis current ratio is now one. If the finger has not changed location along the length of the resistive elements, the Y-axis current ratio is also unchanged because of the symmetry of the two resistive elements.

For finger positions in between those already discussed, the X-axis current ratio is proportional to the ratio of the capacitances between the resistance elements and the finger. The Y-axis relationship is independent of X-axis position.

The same technique can be used in other musical and non-musical applications where the control surface is narrow. For example, the keys of a synthesizer keyboard can be equipped with individual touch panels, allowing the player to independently modify two characteristics of the notes being played by changing the position of his fingers on the keys. The black keys, being narrow, can most conveniently be fitted with two resistive elements.

Figure 5:
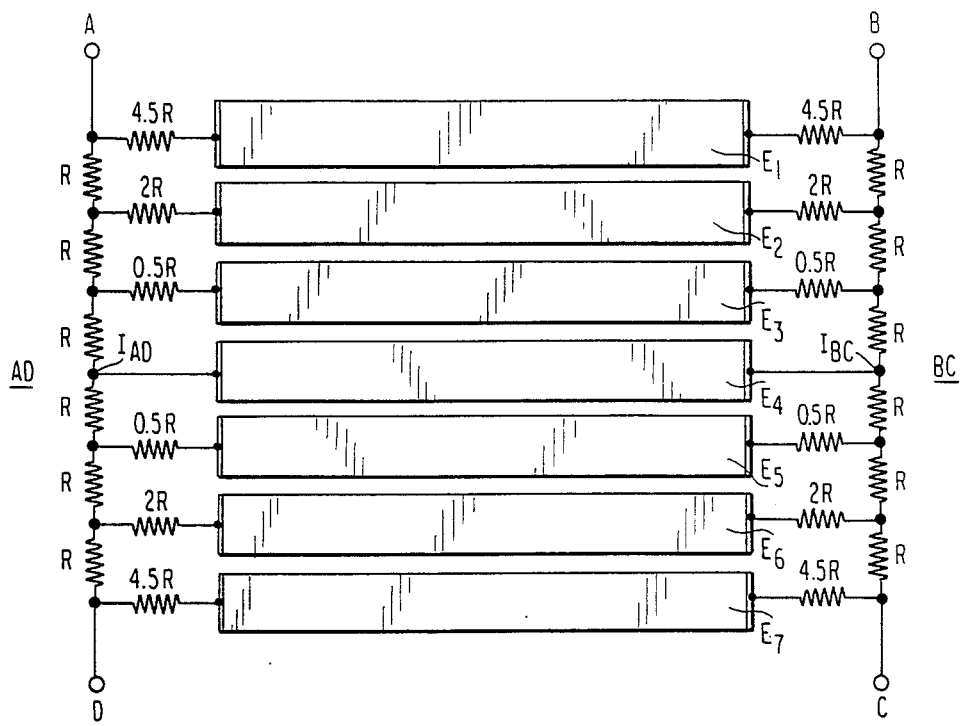
FIG. 5 illustrates an array of resistive elements whose ends are interconnected with the resistor networks.

FIG. 5 illustrates a resistive touch panel surface with a multiplicity or plurality of parallel resistive elements E1, E2, E3, E4, E5, E6, and E7, whose ends are interconnected with two resistor networks, AD and BC, respectively.

Resistor networks AD and BC are identical, each including a chain of equal value resistors R with the intermediate points IAD and IBC being directly connected to the ends of element E4 and the elements to each side thereof being connected through a resistor value proportioned parabolically as indicated.

Elements can conveniently be created by starting with a web of polyester film with a resistive coating, and scribing or etching cuts through the resistive coating ⅛-inch apart and parallel to the length of the web. This array can be substituted for the two resistive elements in the block diagram of FIG. 4. Of course, the resistive array can be formed in a transparent glass plate as an indium tin oxide layer and etched to form the resistive lines. Moreover, the resistive lines can be made of fine resistance wires such as nichrome wires embedded in a resin matrix or held in array by a resin matrix.

This array can also be used to produce a substantially uniform electric field of any desired orientation in the manner described in U.S. Pat. No. 4,198,539. The uniformity of the field produced will improve as the number of parallel resistive elements is increased.

It will be appreciated that other embodiments and modifications of this invention as defined in the following claims.

We claim:

1. A selected touch point locating apparatus comprising, a plurality of electrical touch members, said electrical touch members being arranged in a rectangular array and having X and Y axis and spaced closely so that two or more can be bridgeable by a user's finger tip, means for causing an electric current to flow through said selected touch point as an algebraic sum of separate currents through the ones of said electrical touch members touched by said human finger tip, said touch members respectively dividing an electric current flowing through said user's finger tip into current components that are a function of the respective portions thereof touched by said user's finger tip, and means for translating the relative amplitudes of said separate current components to signals corresponding to X axis and Y axis coordinates of position of said selected touch point on said array of electrical touch members.

2. The invention defined in claim 1 wherein said array of spaced electrical touch elements is constituted by an array of impedance elements.

3. Selected touch point locating apparatus comprising, an linear array of two or more impedance elements, said array of impedance elements being so closely spaced as to be bridgeable by a human finger and a human finger can be rolled thereon to vary the collective area of said impedance elements touched thereby, means for causing an electric current to flow through a selected touch point as an algebraic sum of separate currents through the ones of said impedance elements touched by said human finger so that when varying portions of the finger tip are placed on several of said impedance elements in said linear array of impedance elements constituting said collective area, it causes the output for one axis to change while the other output changes as a function of finger position along the length of said touched impedance element, and means for translating the relative amplitudes of said separate currents to at least two signals corresponding to a location in two axes of said selected touch point on said array of impedance elements including, a pair of resistance networks, each resistance network extending between a pair only of connection points, and means connecting one end of each impedance element to spaced points in said resistance network, respectively, and means connecting said connection points to said means for translating.

4. The invention defined in claim 3 wherein each said ridge has at least one notch formed therein for tactilely conveying information to a user.

5. Position sensing apparatus comprising, a substrate having a surface, at least a pair of linear resistance elements extending along parallel paths on said substrate surface, said linear resistance elements being spaced less than a finger-width apart so they can be spanned by a finger, circuit means coupled to all ends of said linear resistance elements to derive from a current flow therethrough a position of a finger touching any one or more of said linear resistance elements, said position being a function of portions of a finger tip placed on several of linear resistive elements to cause one output for one axis to change while any output for another axis changes as a function of finger position along the length of a touched one of said linear resistance elements.

6. Position sensing apparatus as defined in claim 5 wherein said resistance elements are transparent.

7. The invention defined in claim 6 wherein said resistance elements are formed on a transparent substrate by applying a uniform resistance layer to a surface of said transparent substrate and removing resistance material to form said linear resistance elements.

8. The invention defined in claim 6 including transparent layer on said resistance element whereby current flow from a touching finger is through the layer.

* * * * *